2,970,948
METHOD OF PREPARING DRY CULTURE MEDIA

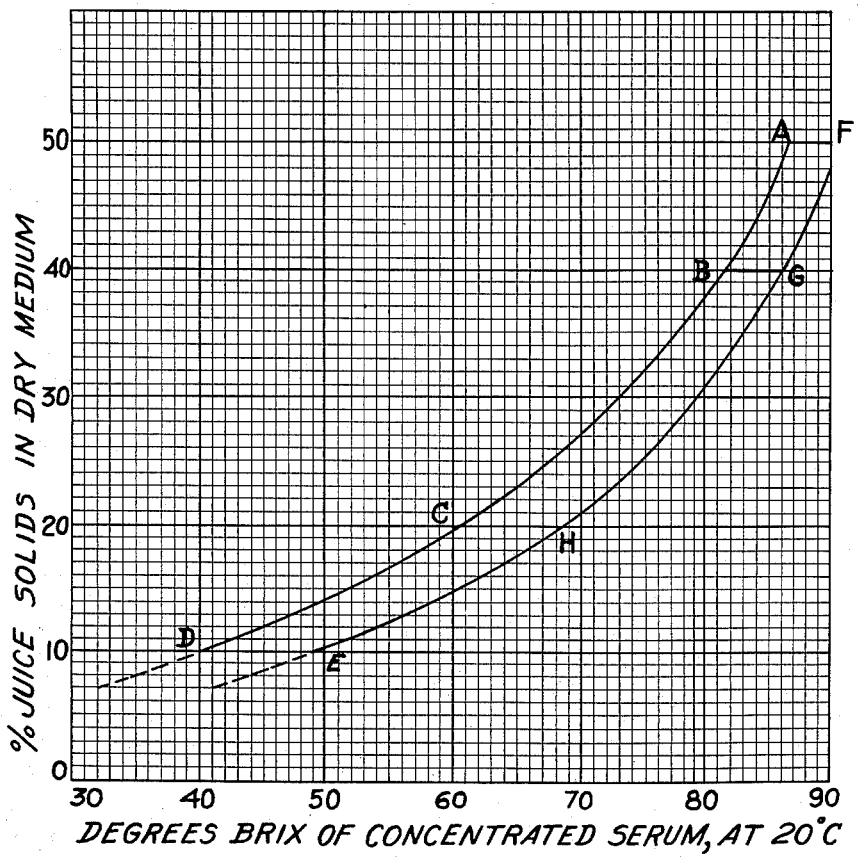

Jesse W. Stevens, Upland, Calif., assignor to Sunkist Growers, Inc., Los Angeles, Calif., a corporation of California Filed Oct. 22, 1953, Ser. No. 387,703

1 Claim. (Cl. 195—102)

This invention relates to a method of preparing, in a dry, stable form, nutrient media which are useful in the cultivation of bacteria and other microorganisms.

In the last few years, citrus serum agar culture media have been widely adopted in the citrus products industry for detection of spoilage organisms in citrus juices. Orange serum agar is an especially favored medium for the growth of organisms capable of growing and causing spoilage in citrus juices, particularly bacteria of the lactic acid group which tend to be somewhat exacting in their nutritive requirements. Orange juice contains many of the vitamins and accessory food factors required by certain bacteria for normal growth, which may account for the high productivity of the medium. The serum obtained from orange juice or other fruit juices may be defined as the clear liquid portion which remains after insoluble solid materials have been removed.

Until the present invention, it has been the practice to prepare a quantity of orange serum which could be either used immediately to produce nutrient media or preserved for future use. Great difficulties have been encountered in past attempts to prepare dried orange juice products in a form that will remain stable over long periods of time and will readily dissolve in water, even after long storage. Dried media heretofore produced have been very hygroscopic and difficult to disperse in water. A satisfactory dried orange serum medium is advantageous in that it is a convenient material for preparing the final culture medium, simply requiring the addition of water thereto in amounts dependent upon the solids concentration desired, to form an aqueous solution which, after sterilization, would be ready for use. No satisfactory method has been devised, prior to my discovery, for preparing a satisfactory dried orange serum medium due to drying and storing difficulties and the hygroscopic nature of dried orange juice. Unless made according to my invention, caking of the dried product during extended storage is apt to occur, making subsequent dispersion difficult.

It is an object of this invention to provide culture media in dry powder form which are stable and may be stored for substantial periods of time without caking.

A further object is to prepare culture media which are readily dispersible in water, even after being stored for long periods of time.

A further object is to provide a composition in dry powder form which may be used to prepare culture media solely by the addition of water thereto, the final media having substantially the same productivity as those prepared from fresh nutrient materials.

A further object is to provide a method of preparing dried fruit serum agar, and particularly orange serum agar, which may be used as the starting material to prepare brilliantly clear nutrient culture media.

Other more specific objects of the invention will be obvious to those skilled in the art from the disclosure which follows.

In the drawing the figure shows the relationship between the percentage of soluble juice solids desired in the dry medium and the degrees Brix of the concentrated serum at 20° C. which should be used to produce said desired percentage.

It will be evident from the drawing that for any percentage of juice solids desired in the dry medium, there is a preferred range of concentration of the serum, expressed in degrees Brix, which may be used to obtain (1) the desired percentage of juice solids and (2) a serum-nonjuice solids mixture which dries satisfactorily and remains stable for long periods of storage. This may also be expressed as a procedure of removing water from the serum to the extent that the water remaining in a quantity of serum necessary to provide the predetermined quantity of juice solids will, when mixed with a corresponding predetermined quantity of nonjuice solids, produce a mixture that may be readily dried. This amount of water will produce, with the nonjuice solids, a uniformly moist, nonpasty mixture. Such a mixture will not contain sufficient water to hydrate the agar or any of the dry nonjuice solids to the extent that their quality and stability will be adversely affected.

The objects of applicant's invention are attained by following four basic steps which broadly include:

(1) Completely flocculating and/or removing the suspended insoluble solids of fruit juice by the addition of pectinesterase to obtain a brilliantly clear serum that will result in a clear culture medium when the latter is prepared for use.

(2) Concentrating or reducing the water content of the brilliantly clear serum to the extent that the water in the quantity of serum necessary to provide the juice solids desired will uniformly moisten the predetermined quantity of nonjuice solids desired in the dry medium.

(3) Mixing a quantity of concentrated serum necessary to provide the desired quantity of juice solids with the dry nonjuice solid ingredients desired in the final culture media, to produce a discontinuous moist mixture.

(4) Drying the mixture, preferably under vacuum, whereby at the end of the drying period the temperature does not exceed 120° F.

The following examples are given in illustration of these steps and are not intended as limitations on the scope of this invention. When percent values are given, they are percent by weight.

Example 1

3.7 grams of pectinesterase and 5.2 grams of calcium carbonate were added to 10 liters of orange juice having a density of 1.04437 at 20° C. and a pH of 3.45 (11.5° Brix). The mixture was allowed to stand for about 2 hours at 100° F. to obtain complete precipitation of soluble pectin and other insoluble matter, such as insoluble pectin and certain glycosides, causing them to settle out, leaving a clear supernatant liquid. The flocculated juice was passed through a centrifuge to remove the bulk of the insoluble matter. About 1% of diatomaceous filter aid was added to the centrifuged juice and the mixture passed through a filter, without the use of heat, to obtain a brilliantly clear serum. The filter mat was prepared by depositing a layer of paper pulp on a filter cloth in the Buchner funnel and then coating the paper pulp layer with filter aid. The use of calcium carbonate in the clarification process reduces the titratable acidity of the juice, with a corresponding increase in pH.

The brilliantly clear orange serum obtained by the above procedure was concentrated in a low temperature evaporator at a temperature in the range from 55° to 80° F., whereby the water content was reduced until the concentrate was found to have a Brix value of 86.4°.

The following ingredients of the medium were thoroughly mixed together:

| | Gm. |
|---|---|
| Tryptone | 10 |
| Yeast extract (powder) | 3 |
| Dibasic potassium phosphate | 2.5 |
| Dextrose | 5 |
| Dried agar | 15 |

Yeast extract is the water soluble portion of autolyzed yeast.

27.8 grams of the 86.4° Brix concentrated juice containing 24.0 grams orange juice solids was then added gradually, with constant stirring, until the concentrate was uniformly mixed with the other nonjuice solid materials. This resulted in a moist noncontinuous mixture containing all the ingredients of the medium.

This mixture was dried in enamel trays at a temperature not exceeding 120° F. under vacuum for approximately 8 hours. The finished dehydrated orange serum agar medium contained 41.1% juice solids and had a moisture content of 1.89%. The dried medium, in the form of a free flowing powder, was stored in tightly stoppered bottles.

After storage for over one year at room temperature in a tightly stoppered bottle, the medium retained the characteristics of a free flowing powder and there was no evidence of caking. This dried medium dissolved readily in cold water in the amount of 58.4 grams in 1 liter of water. The pH of the unadjusted, unheated medium was 5.17. Inasmuch as this pH is considered too low for the most favorable growth of citrus spoilage organisms, 4 ml. of 0.993 N NaOA solution were added per liter of the medium to raise the pH to 5.45. Sterilization was accomplished by autoclaving for 15 minutes at 248° F. after which the pH was found to be 5.39. The sample when poured on a plate and cooled, produced a brilliantly clear medium which was found to be capable of supporting a vigorous growth when inoculated with orange juice containing spoilage organisms.

Example 2

The process used to prepare the dried medium of Example 1 was repeated, except that 18 grams of concentrated orange serum containing 30% water and having a Brix of 70° was employed. The weight of orange juice solids in the serum used was 12.6 grams, the other ingredients being present as follows:

| | Gm. |
|---|---|
| Tryptone | 10 |
| Yeast extract (powder) | 3 |
| Dibasic potassium phosphate | 0.7 |
| Dextrose | 5 |
| Agar (dried) | 15 |

Upon drying the orange serum agar contained 27.2% juice solids by weight of the total solids and a final moisture content of 1.6%.

This medium was dissolved in the amount of 45.7 grams in 1 liter of water at room temperature. The pH of this solution was 5.75. After autoclaving for 15 minutes at 248° F., the pH was found to be 5.72. This composition when allowed to cool and gel, produced a transparent medium which supported a vigorous growth when inoculated with orange juice containing spoilage organisms.

Example 3

Example 2 was repeated except that in order to produce the same juice solids content in the final dry product, i.e. 27.2%, 16.6 grams of concentrated orange serum containing 23% water and having a Brix of 77° was substituted for the 18 grams of 70° Brix concentrate used in Example 2. A moist mass was obtained which dried readily under vacuum to produce a stable powder having a moisture content of 1.02%.

This medium was dissolved in the amount of 45.9 grams in 1 liter of water at room temperature. The pH of this solution was found to be 5.44. After autoclaving the pH was found to be 5.39.

Example 4

Example 1 was repeated, except that 13.6 grams of concentrated orange serum of 60° Brix was employed and the weight of orange juice solids in the serum used was 8.16 grams, and the remaining ingredients were as follows:

| | Gm. |
|---|---|
| Tryptone | 10 |
| Yeast extract (powder) | 3 |
| Dibasic potassium phosphate | 0.1 |
| Dextrose | 5 |
| Dried agar | 15 |

This mixture was then dehydrated to produce a dry medium containing 19.8% juice solids and a moisture content of 1.6%.

This medium was dissolved in distilled water at room temperature in the amount of 40.9 grams of the medium per liter of water. The pH of the solution was found to be 5.83. After autoclaving for 15 minutes at 248° F., the pH was 5.79. Poured plates obtained by use of this media were very clear and supported an abundant growth of those spoilage organisms found in orange juice.

Example 5

Example 4 was repeated except that in order to produce the same juice solids content in the final dry product, i.e., 19.8%, 12.2 grams of concentrated orange serum containing 31.6% water and having a Brix of 68.4° was substituted for the 13.6 grams of 60° Brix concentrate used in Example 4. A moist granular mass was obtained which dried readily under vacuum to produce a stable powder having a moisture content of 1.03%.

This medium was dissolved in the amount of 40.9 grams in 1 liter of water at room temperature. The pH of this solution was found to be 5.49. After autoclaving the pH was found to be 5.46.

Example 6

The following ingredients were thoroughly mixed together:

| | Gm. |
|---|---|
| Dibasic potassium phosphate | 29 |
| Dried agar | 220 |

Concentrated orange serum of 86.4° Brix in the amount of 194.9 grams was added slowly, with stirring, to the dry ingredients. This amount of serum contained 168.4 grams of solids. After drying as in Example 1, the juice solids content was found to be 41.5% of the total solids. The pH of the composition obtained by dissolving 27.7 grams of this dried mixture in 1 liter of water was found to be 5.77 before sterilization. After sterilization the pH was found to be 5.63 and upon pouring the liquid and cooling, a gel of excellent clarity was obtained.

If desired, other conventional solid nutrient ingredients may be added to the dried mixture at any time prior to dissolving it in water. If the dried mixture is to be kept for any length of time, such added ingredients should be substantially anhydrous.

The concentration of the serum is preferably carried out at as low a temperature as possible. For example, the juice temperature should not exceed about 105° C. in order to substantially avoid loss in nutritive value, although a higher temperature at the end of the concentration period may be desirable to facilitate handling of the concentrate.

The extent to which the clarified juice serum is concentrated depends primarily on the juice solids content desired in the final dried medium. If the serum is over-concentrated it will not contain sufficient water to properly moisten the dry ingredients, resulting in a poor distribution of the juice solids on the dry nonjuice solids. If underconcentrated it will, when added to the dry nonjuice solids, produce a wet, pasty, solid mass that cannot be readily dried. Certain of the dry ingredients, particularly the agar, may be damaged by hydrolysis by using underconcentrated serum. As a general rule, it is necessary to use a higher degrees Brix concentrate in preparing a medium of high juice solids content. When smaller proportions of juice solids are desired in the final medium, a lower degrees Brix juice serum concentrate may be used and is preferable.

If a serum having a high degrees Brix is used to obtain a predetermined percentage of juice solids in the final medium, it will be obvious that smaller amounts thereof will be required than where serum having a lower degrees Brix is used. It has been found, however, that for any particular percentage of juice solids desired in the final dried medium, it is necessary to select a concentrate within a restricted range of degrees Brix values.

The relationship between the percentage of juice solids in the dried medium and the degrees Brix of concentrate which is needed to produce said percentage and which will form a moist, noncontinuous mass of pellets or granules on thorough mixing, is graphically shown in the drawing. For different desired percentages of juice solids in the final dry medium, there is shown within the area BCHG the preferred degrees Brix range of concentrate which when uniformly mixed with the dry nonjuice solids of the medium in amounts sufficient to produce a moist discontinuous mass, will produce a composition in such physical form that it will dry to a powder which is stable in accordance with the teachings of this invention.

If a particular percent juice solids is desired in the final medium and the degrees Brix value which is used falls substantially to the left of curve AD, it would be necessary to add so much concentrate to the nonjuice solids that upon mixing, a mass of gummy consistency would be formed which would be very difficult to dry and would yield a product of inferior keeping qualities. Furthermore, the larger amounts of concentrate required in such a case impart too much water to the solid material, making the agar more susceptible to hydrolysis. When such hydrolysis occurs, the composition is of little value as a culture medium, since the agar loses its gel forming ability when hydrolyzed.

When a particular percent juice solids is desired in the final medium and the degrees Brix value used falls substantially to the right of curve EF, it will be very difficult to obtain a uniform mixture, due to lack of adequate water in the serum. Furthermore, when the Brix value of the serum approaches or exceeds 90°, it is necessary to heat the concentrate to such high temperatures to reduce its viscosity to enable mixing, that nutritive values of the juice may be injured materially.

Although concentrates of from about 60° to 86° Brix falling within the area BCHG are preferred for use in preparing a stable dried medium, the greater area ADEF is also useful although juice solids below 20% or above 40% are not ordinarily preferred in culture media forming the subject of this invention. When the juice solids-degrees Brix combination falls within area ADEF, a moist discontinuous mass is readily obtained by simply adding the concentrate slowly in a small stream with constant mixing. When a concentrate having a degrees Brix value higher than that indicated within area ADEF for any particular percent juice solids in the final dry medium, it is necessary to use great care in adding the concentrate to obtain uniform mixing. Such concentrates, having Brix values to the right of curve EF, may be employed only with difficulty and should be added to the nonjuice solids in one or more fine streams to facilitate uniform mixing, particularly where concentrates of high degrees Brix are used to produce media of low juice solids content. For this reason Brix values falling substantially to the right of curve EF are not preferred.

While proportions of soluble juice solids below 10% may also be used if desired, a juice solids content of 50% in the dry product is about the maximum that can be dried satisfactorily, and the final product at this high juice solids value is rather hygroscopic. Regardless of the concentration of serum used, the ingredients must be thoroughly mixed while the serum is being gradually combined with the nonjuice solids of the composition. When all the ingredients have been combined, the composition must be in the form of a discontinuous moist mass. In other words, the mixture will be in the form of moist discrete particles. The addition of larger amounts of serum to this moist particulate mixture must be avoided as this would cause agglomeration of the particles and produce either large chunks or a continuous mass which is sticky and very difficult to dry.

When it is desired to use a concentrate having a relatively high degrees Brix value, as for example, above about 75° Brix, it is possible to facilitate intimate mixing by warming the concentrate to reduce its viscosity prior to mixing with the nonjuice solids and thereby obtain a satisfactory discontinuous nonsticky composition. Heating should not exceed about 105° F. and the preferred working range for the present invention is from about 35° F. to about 105° F. The viscosity of the concentrates, particularly the more highly concentrated serums, may be increased somewhat, if desired, by reducing the temperature below room temperature. Thus by appropriate warming or cooling of a concentrate, it is possible to improve the spreading of the concentrate over the nonjuice solids, and this is particularly true of concentrates having degrees Brix greater than about 75. The viscosity of 83° Brix concentrate at 20° C. has been found to be ideal for mixing purposes and concentrates of higher or lower viscosity may be adjusted to approximate this ideal value by warming or cooling, as necessary.

In the drying step the best results are obtained when a sufficiently small quantity of material is placed in the tray to permit maximum puffing when heated under a vacuum. A load of up to about 300 grams of fresh material per square foot of tray surface is most satisfactory in this respect. Use of a vacuum hastens drying and is preferred. The drying may be performed in other ways, as in the presence of drying aids such as calcium chloride. At the beginning of the drying step, it is possible to raise the temperature to above 120° F. However as the drying proceeds, high temperatures must be avoided and at the end of drying, the temperature of the entire solid mass should not exceed 120° F. The finished dry preparation is rather hygroscopic but less so than other dried juice products of comparable juice solids content. Because of hygroscopicity, it is best to keep the juice solids content as low as will give satisfactory productivity. Handling and packaging of the product is preferably done in a dry atmosphere. An in-package desiccant also can be used to control moisture.

One important advantage of my method is that orange serum of rather high acidity can be used without apparent damage to the agar. The pH of some of the samples after drying being as low as 4.88. Moisture and pH are both factors contributing to the hydrolysis of agar. When the moisture is high, partial or total hydrolysis may occur at relatively high pH values. Where the agar is maintained relatively dry there is no apparent hydrolysis at pH values down to about 4.8. Inasmuch as my method does not contemplate the use of more water than is absolutely necessary to provide adequate distribution of the serum on the nonjuice solids, these lower pH values may be safely employed. It will be appreciated, however, that even under the conditions prevailing in my method, damage by hydrolysis could occur at low pH values and for this reason, I prefer not to employ serum having a pH below about 4.8.

The acidity of a medium containing orange serum agar dissolved therein should have a pH value within the range from 5.3 to 6.8, inasmuch as this range is favorable for the growth of most organisms. Many users of this medium for citrus juice products operate in the range of 5.4 to 5.6. The pH may be adjusted at some stage prior to drying the orange serum agar, whereupon a pH of 5.3 to 6.8 is obtained by simply dissolving the serum agar in water in the desired concentration. If this predrying pH adjustment is made, it is preferred to add acid or base, such as sodium hydroxide or dibasic phosphate as necessary, to the clarified juice prior to the concentration step. Once the juice has been concentrated, it is more difficult to mix with acid or alkali than when the juice is in a less viscous form. Alternatively, it is possible to delay adjustment of the pH of the serum agar to within the range of 5.3 to 6.8 until the dried serum agar is to be used, at which time it is dissolved in water and the pH of the resulting solution adjusted to a value within the desired range.

The dibasic potassium phosphate used should be finely powdered so that it will be uniformly distributed in the dry medium. The phosphate acts as a buffer and may be used in amounts required to obtain a pH within the range 5.3 to 6.8 when the serum agar is dissolved in water for use. It is preferable to dry the agar before use but this is not essential. The remaining ingredients used in the medium are conventional and may be added preferably in the dry state in amounts commonly used in culture media. Amorphous materials preferably constitute at least a major proportion of the total nonjuice solids present in the final dried medium, inasmuch as such solids are more absorbent and the particles have greater surface area than crystalline solids. Amorphous materials are particularly needed where media of high juice solids are being made. Agar is such a material, and will in most formulas, provide adequate material of this nature.

When the pH of the medium has been adjusted prior to the drying step to within the range of from 5.3 to 6.8, all that is required is that the dried medium be dissolved in water and sterilized to be ready for use. Within the range of 5.3 to 6 the pH of the medium decreases only slightly during sterilization. At higher pH values a considerably greater drop occurs. When the pH of a mixture has not been adjusted prior to drying to produce a final medium within the pH range from 5.3 to 6.8, the pH of an aqueous solution of the unadjusted material may be as low as about 4.8. The pH of the final medium prepared from this unadjusted material may then be increased to from 5.3 to 6.8 by adding alkali or dibasic potassium phosphate to the aqueous solution containing the serum agar dissolved therein.

It is furthermore possible to mix the orange serum with amorphous ingredients other than agar, which are conventionally used in culture media. For example, ingredients such as tryptone and yeast extract may be mixed with the orange serum in the absence of agar and dried, the agar or other suitable gelling material being then mechanically mixed with the dried material. It is only necessary that the orange serum be dried in the presence of a solid material. In the higher juice solids ranges, it is preferable that a major proportion of the nonjuice solids are amorphous.

The most important factor affecting the stability of the medium is its moisture content. Caking or lumping is an indication of excessive moisture. Samples of high juice solids content containing from 0.9 to 2.9% moisture have been stored 12 to 15 months at room temperature without showing signs of caking. Similar samples containing 3.9 to 4.2% moisture were definitely caked after five months of storage. Other samples of 3.4 to 3.6% moisture content showed slight caking after about a year of storage at room temperature. Applicant prefers, therefore, to maintain the moisture content at a value not substantially greater than 3%. From a practical standpoint the moisture level should be reduced to 1 or 2% to allow some leeway for moisture pickup in use. The final moisture contents of the samples were determined by grinding and drying 5 to 10 gram portions for 15 to 16 hours at 120° F. under 0.2 to 2 mm. pressure.

The process has been found to be particularly suitable when orange serum is used. However, grapefruit and lemon serum are also suitable. The present process may also be used for preparing media from any fruit or vegetable serum or extract, which contains the necessary elements required for the growth of microorganisms. Where the term "fruit" is used in the specification and claim, it is used in its broadest sense to include any product of plant growth useful to man. This is one meaning of the term "fruit" as given by Webster's dictionary, and is the meaning intended throughout the instant application. Tomato, carrot, prune, and potato juices or extracts are examples of other suitable starting fruit derivatives. Added pectinesterase is used to clarify juices containing pectin where there is no naturally occurring pectinesterase or the amount present is insufficient for rapid clarification. Where no pectin is present other suitable methods of clarification may be employed.

The finely divided solid material with which the concentrate is mixed must be water soluble and a major part of said solid material should preferably be amorphous. This solid material may be a mixture of several different substances, but at least one of the solid materials present must be cabale of setting to a gel at room temperature upon cooling an aqueous solution thereof. The most common example of such a material is agar. Water soluble salts of pectic acid and alginic acid are also suitable gelable materials. Gelatin may be used in those cases where the medium does not encounter temperatures substantially above room temperature.

It is obvious that many variations may be made in the products and processes of this invention without departing from the spirit and scope thereof as defined in the appended claim. What is claimed is:

A method for producing a dehydrated orange serum culture media, comprising clarifying orange juice by adding pectinesterase to said juice and subjecting the juice to the action of said pectinesterase for a sufficient time to precipitate the pectin and precipitating the suspended insoluble solids thereof, removing the precipitated material to produce an orange serum, concentrating said serum at a temperature not exceeding 105° F. to not less than 40% nor more than 90% soluble solids, mixing said serum with agar to form a moist discontinuous mass containing juice-solids in an amount of from about 10 to 50% by weight of the total solids, and dehydrating said mass at a temperature of not more than 120° F.

References Cited in the file of this patent

UNITED STATES PATENTS

| | | |
|---|---|---|
| 1,993,287 | Stokes | Mar. 5, 1935 |
| 2,157,839 | Wertheimer | May 9, 1939 |
| 2,444,266 | Owens | June 29, 1948 |
| 2,483,549 | Leo et al. | Oct. 4, 1949 |
| 2,557,053 | Leo et al. | June 12, 1951 |
| 2,572,846 | Homiller | Oct. 30, 1951 |

OTHER REFERENCES

Gershenfeld: Bacteriology and Allied Subjects, Mack Pub. Co., Easton, Pa., 1945, pp. 66–67.

Levine: Culture Media for Cultivation of Microorganisms, Williams and Wilkins Co., Baltimore, Md., 1930, pp. 437, 466, 653.

Willman: Food Industries, August 1933, pp. 294–295, 301.